United States Patent [19]

Yoshiaki et al.

[11] Patent Number: 5,276,103

[45] Date of Patent: Jan. 4, 1994

[54] URANIUM ADSORBENT

[75] Inventors: Kobuke Yoshiaki, Kyoto; Yoshida Shigeto, Tokyo, both of Japan

[73] Assignee: Goran Lagstrom, Stockholm, Sweden

[21] Appl. No.: 776,412

[22] PCT Filed: Mar. 29, 1990

[86] PCT No.: PCT/SE90/00203

§ 371 Date: Nov. 25, 1991

§ 102(e) Date: Nov. 25, 1991

[87] PCT Pub. No.: WO90/11826

PCT Pub. Date: Oct. 18, 1990

[30] Foreign Application Priority Data

Mar. 31, 1989 [JP] Japan .................................. 1-78496
Jan. 9, 1990 [JP] Japan .................................. 2-1104

[51] Int. Cl.⁵ .............................................. C08F 8/32
[52] U.S. Cl. ............................. 525/329.1; 525/329.2; 525/329.3; 525/380
[58] Field of Search ................ 525/329.1, 329.2, 329.3

[56] References Cited

U.S. PATENT DOCUMENTS 4,622,366 11/1986 Sugo et al. .

OTHER PUBLICATIONS

Patent Abstracts of Japan, vol. 8, No. 46, C212, abstract of JP 58-205544 publ. Nov. 30, 1983 (Nippon Genshiryoku Denkyusho).
Patent Abstracts of Japan, vol. 8, No. 46, C212, abstracts of JP 58-205545, publi. Nov. 30, 1983 (Nippon Genshiryoku Kenkyusho).

Primary Examiner—Bernard Lipman
Attorney, Agent, or Firm—Dowell & Dowell

[57] ABSTRACT

A uranium adsorbent is prepared by reacting a polymer containing nitrile groups with hydroxylamine, wherein the amount of imidedioxime groups formed is relatively larger than that of amidoxime groups formed in terms of the integral values of areas of peaks respectively assigned to imidedioxime groups and amidoxime groups in the $^{13}$C-NMR spectrum chart of the adsorbent. The reaction may be effected: 1) in an organic solvent containing water under substantially neutral or weakly alkaline conditions, or 2) under acidic conditions. The uranium adsorptivity of the adsorbent is improved by hydrolyzing its residual nitrile groups under alkaline conditions.

4 Claims, 2 Drawing Sheets in d6-DMSO

CPMAS

URANIUM ADSORBENT

BACKGROUND OF THE INVENTION

1. Field of the Invention

The present invention relates to a uranium adsorbent for use in trapping uranyl ions, and more particularly to a uranium adsorbent for use in trapping uranyl ions contained in aqueous solutions such as seawater.

2. Discussion of the Related Art

Attempts to recover uranyl ions from aqueous solutions containing uranyl ions, such as seawater and water drained from dams, have recently been made in various quarters. Uranyl ions have been attracting attention as a fuel material of the atomic energy which has accounted for an increasing proportion among the various sources of energy production these days. Thus, developed nations have been competing in research with a view to developing effective methods of recovering uranyl ions from inexhaustible seawater.

Conventional methods of trapping uranyl ions contained in an aqueous solution such as seawater include a process comprising the step of contacting an aqueous solution such as seawater with an adsorbent such as a polymer adsorbent bearing an inorganic metallic oxide (e.g. titanic acid) or a macrocyclic hexacarboxylic acid, or an amidoxime-containing adsorbent prepared by reacting a nitrile-containing polymer with hydroxylamine, and the step of eluting uranyl ions adsorbed on the adsorbent.

There are a number of known serviceable forms of amidoxime-containing adsorbents, examples of which include not only grainy and fibrous adsorbents prepared using as a starting material a nitrile-containing polymer available at a low price, but also composite adsorbents comprising an amidoxime-containing substance in powdery form incorporated into a polymer matrix.

As described above, an adsorbent containing amidoxime groups is prepared by a reaction of a polymer containing nitrile groups with hydroxylamine. It has been said that, when hydroxylamine is used in the form of an aqueous solution thereof in the above-mentioned reaction, a large number of functional groups such as hydroxamic acid groups, carboxylic amido groups and carboxylic acid groups, which take little part in adsorption of uranium, are formed as by-products through hydrolysis of amidoxime groups in addition to formation of amidoxime groups, which have heretofore been believed to take direct part in adsorption of uranium. In view of this, it has been recommended that hydroxylamine should be used in the form of a methanol solution thereof rather than an aqueous solution thereof in order to secure amidoxime groups (see Egawa, Nippon Kagaku Kaishi, 1980, p. 1767).

However, an amidoxime-containing adsorbent prepared using a methanol solution of hydroxylamine is generally poor in the capacity of adsorbing uranyl ions contained in seawater (hereinafter referred to as the "uranium adsorptivity"). A treatment of the above-mentioned amidoxime-containing adsorbent with an alkali to improve the uranium adsorptivity thereof was proposed (see Kato et al., Bulletin of the Society of Sea Water Science, Japan, Vol. 35, p. 156 (1881), and Japanese Patent Publication No. 16,812/1884). The reason for such an improvement in the uranium adsorptivity of an amidoxime-containing adsorbent through a treatment thereof with an alkali has not thoroughly been elucidated yet, but an increase in the hydrophilicity of the adsorbent through hydrolysis of nitrile groups remaining in the above-mentioned amidoxime-containing adsorbent is claimed to be responsible for the improvement (Kato et al, Nippon Kagaku Kaishi, 1982, p. 1455).

SUMMARY OF THE INVENTION

An object of the present invention is to provide a uranium adsorbent which is much higher in uranium adsorptivity than the aforementioned conventional uranium adsorbents.

In accordance with the present invention, there is provided a uranium adsorbent prepared by reacting a polymer having nitrile groups with hydroxylamine, wherein the amount of imidedioxime groups formed is relatively larger than the amount of amidoxime groups formed as determined by the integral values (areas) of peaks respectively assigned to imidedioxime groups and amidoxime groups in the $^{13}$C-NMR spectrum chart of the uranium adsorbent.

Such a uranium adsorbent can be prepared, for example, by reacting a nitrile-containing polymer with hydroxylamine in an organic solvent containing water under substantially neutral or weakly alkaline conditions, or reacting a nitrile-containing polymer with hydroxylamine under acidic conditions, as will be described later in detail.

In accordance with the present invention, there also is provided a uranium adsorbent improved in uranium adsorptivity which adsorbent is prepared by hydrolyzing nitrile groups remaining in the uranium adsorbent of the kind as described above and containing the residual nitrile groups under alkaline conditions.

DETAILED DESCRIPTION OF THE PREFERRED EMBODIMENT

Figure 1:
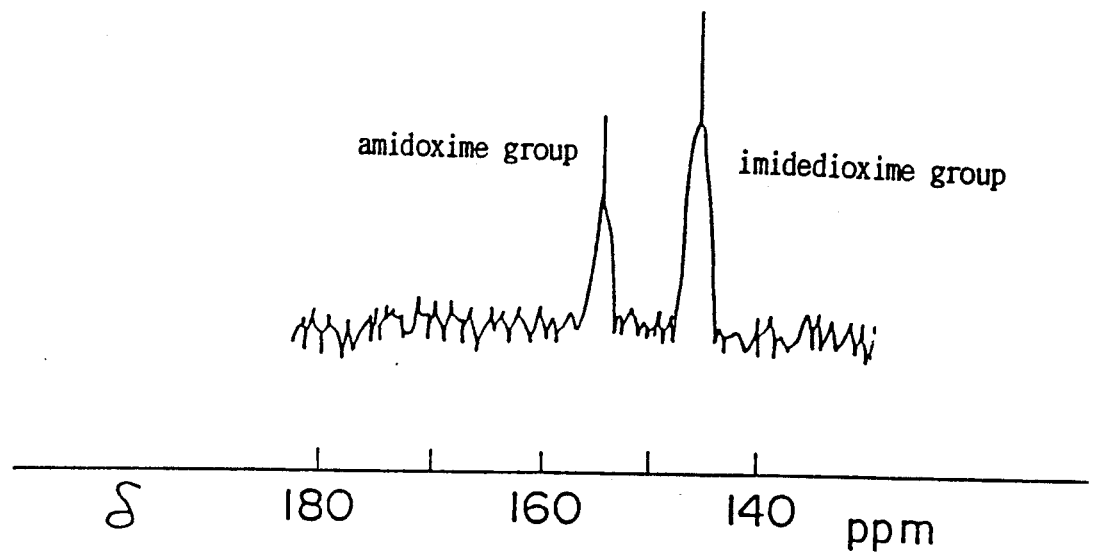
FIG. 1 is a diagram showing the $^{13}$C-NMR spectrum of an example of the uranium adsorbent according to the present invention.

The present invention will now be described in detail.

The present inventors have not only studied the mechanism of uranium adsorption but have also made extensive investigations with a view to developing a uranium adsorbent superior in uranium adsorptivity to the conventional adsorbents. As a result, they have made the following new findings.

It has been discovered that imidedioxime groups are higher in uranium adsorptivity than amidoxime groups which have heretofore been believed to be functional groups taking direct part in the adsorption of uranium.

It has also been discovered that imidedioxime groups are formed in a relatively larger amount (with respect to the aforementioned integral values in the aforementioned NMR spectrum chart; the same basis of comparison will apply hereinafter) than amidoxime groups in a reaction of a polymer containing nitrile groups with hydroxylamine when the reaction is effected in a mixed solvent system of water and an organic solvent under substantially neutral or weakly alkaline conditions.

It has further been discovered that imidedioxime groups are formed in a relatively larger amount than amidoxime groups in a reaction of a polymer containing nitrile groups with hydroxylamine when the reaction is effected under acidic conditions.

It has still further been discovered that, when the uranium adsorbent of the present invention, prepared in the manner as described above to form a relatively larger amount of imidedioxime groups than that of amidoxime groups, is superior in uranium adsorptivity to the conventional uranium adsorbents, when used to adsorb thereon uranyl ions.

It has still further been discovered that, when the uranium adsorbent of the present invention, prepared in the manner as described above to form a relatively larger amount of imidedioxime groups than that of amidoxime groups while leaving some nitrile groups intact, is subjected to hydrolysis of the residual nitrile groups under alkaline conditions, the uranium adsorptivity of the resultant adsorbent is remarkably increased.

Although it has already been known that a treatment of a uranium adsorbent containing amidoxime groups with an alkali improves the uranium adsorptivity of the adsorbent as described hereinbefore, the above-mentioned uranium adsorbent according to the present invention which has been subjected to hydrolysis of the residual nitrile groups under alkaline conditions is improved in uranium adsorptivity to an extremely large extent, as compared with the above-mentioned conventional alkali treatment.

The reason for such a remarkable increase in the uranium adsorptivity of the polymer adsorbent according to the present invention through hydrolysis of the residual nitrile groups thereof under alkaline conditions has not been elucidated yet, but is believed to be that an increase in the hydrophilicity of the polymer adsorbent through hydrolysis of the residual nitrile groups thereof is extremely effectively in the case of the present invention.

A description will now be made of processes for producing a uranium adsorbent according to the present invention.

Examples of the polymer containing nitrile groups that can be used for the production of the uranium adsorbent of the present invention include homopolymers of monomers containing a nitrile group(s), copolymers of different monomers containing a nitrile group(s) with each other, and copolymers of monomers containing a nitrile group(s) with other types of comonomer(s).

Examples of the monomers containing a nitrile group(s) that can be used in the present invention include acrylonitrile α-substituted with a monomer containing a nitrile group(s). Examples of such compounds include olefins such as ethylene, propylene, and butenes; unsaturated monocarboxylic acids such as acrylic acid and methacrylic acid; various acrylic and methacrylic esters; aliphatic vinyl compounds such as vinyl chloride, vinyl fluoride, vinyl alcohol, vinyl acetate, and vinyl ethyl ether; vinylidenes such as vinylidene chloride and vinylidene fluoride; aromatic vinyl compounds and their derivatives such as styrene, α-methylstyrene, and vinyl toluene; heterocyclic vinyl compounds such as vinylcarbazole and vinylpyrrolidone; dienes such as butadiene; divinyl compounds such as divinylbenzene and divinyltoluene; unsaturated dicarboxylic acids and their anhydrides such as maleic acid and maleic anhydride; allyl compounds such as diallyl phthalate; polyhydric alcohol esters of (meth)acrylic acid such as ethylene glycol diacrylate, ethylene glycol dimethacrylate, and glycerol dimethacrylate; and mixtures thereof In addition to the aforementioned polymers containing nitrile groups, use can be made of other nitrile-containing polymers, examples of which include cyanoethylated polymers such as cyanoethylated cellulose and cyanoethylated polyvinyl alcohol; polymers prepared by treating an active halogen-containing polymer such as polyvinyl haloacetal or a halomethylated copolymer of an aromatic monovinyl compound and a polyvinyl compound with, for example, iminodiacetonitrile to introduce nitrile groups thereinto; and condensation resins prepared using as one component an aromatic or aliphatic compound having a nitrile group(s), such as dicyandiamide, hydroxybenzonitrile or dihydroxybenzonitrile.

The polymer containing nitrile groups can be prepared by a known method or is commercially available.

The polymer containing nitrile groups may be used in any one of various forms including not only grainy, spherical, rod-like, plate-like, membranous, tubular, annular and fibrous forms, but also threadlike, netty, stringy, cloth-like, felty, mat-like and other forms shaped by further fabrication.

According to the first method of reacting a polymer containing nitrile groups with hydroxylamine to form imidedioxime groups, the reaction is effected in an organic solvent containing water under substantially neutral or weakly alkaline conditions In this first method, a hydrous organic solvent such as a lower alcohol containing water is used as a solvent, while using hydroxylamine either as such or in the form of a solution thereof prepared by adding a substantially equivalent or slightly excessive amount of an alkali to a solution of a salt thereof, such as sulfate, hydrochloride, phosphate or acetate, to neutralize the salt. The reaction is usually effected at a temperature of room temperature to 110° C., and preferably 80° to 90° C. The reaction may be effected under pressure in an autoclave. Because the reactivity of hydroxylamine with nitrile groups largely differs from polymer to polymer, preferable reaction conditions should be set depending on the kind of nitrile-containing polymer chosen. It has heretofore been reported that the use of water more or less causes a side reaction to lower the uranium adsorption performance of the resulting hydroxylamine-treated polymer. In the present invention, however, the use of an organic solvent containing water provides a polymer type uranium adsorbent with a high uranium adsorptivity wherein the amount of imidedioxime groups formed is relatively larger than that of amidoxime groups formed.

Too large an amount of water unfavorably causes a side reaction to form functional groups taking little part in the adsorption of uranium, while too small an amount of water unfavorably decreases the yield of imidedioxime groups. From the foregoing point of view, the water content of the mixed solvent system composed of an organic solvent(s) and water is, usually 10 to 90 vol. %, preferably 40 to 60 vol. %, and more preferably about 50 vol. %.

According to the second method of reacting a polymer containing nitrile groups with hydroxylamine to form imidedioxime groups, the reaction is effected under acidic conditions. Solvent systems usable in the second method include organic solvent systems consisting of an organic solvent(s) alone such as a lower alcohol(s), and hydrous organic solvent systems such as lower alcohols containing water. Use is made of an acidic solution of hydroxylamine prepared by adding an alkali to a solution of a salt thereof such as sulfate, hydrochloride, phosphate or acetate to partially neutralize the salt; or an acidic solution of hydroxylamine prepared by adding an acid such as sulfuric acid or hydrochloric acid to a solution of hydroxylamine or a solution of a salt thereof such as sulfate, hydrochloride, phosphate or acetate which solution has been neutralized to neutrality. The reaction is usually effected at a temperature of room temperature to 110° C., preferably 60° to 100° C. The reaction may be effected under pressure in an autoclave. Because the reactivity of hydroxylamine with nitrile groups largely differs from polymer to polymer, preferable reaction conditions should be set depending on the kind of nitrile-containing polymer chosen.

Besides the aforementioned lower alcohols such as methanol and ethanol, other water-soluble polar solvents such as dimethylformamid, dimethyl sulfoxide, tetrahydrofurane and dioxane can be used as organic solvents that may be used in either of the foregoing two methods.

Since the polymer type uranium adsorbent thus prepared according to the present invention has a relatively larger amount of imidedioxime groups formed than that of amidoxime groups formed, it is superior in uranium adsorptivity to the conventional uranium adsorbents. When the above-mentioned polymer type uranium adsorbent, if containing some residual nitrile groups, is further subjected to hydrolysis of the nitrile groups under alkaline conditions, the resulting adsorbent is further remarkably improved in uranium adsorptivity.

Such hydrolysis under alkaline conditions of the uranium adsorbent according to the present invention wherein a relatively larger amount of imidedioxime groups than that of amidoxime groups have been formed while leaving some nitrile groups intact is effected by contacting the above-mentioned adsorbent with a solution of an alkali such as potassium hydroxide, sodium hydroxide, lithium hydroxide, calcium hydroxide, barium hydroxide, potassium carbonate, sodium carbonate, or lithium carbonate. The alkali concentration of the above-mentioned solution may be at least 0.05 N (normal), preferably at least 0.5 N, and can be suitably chosen within the range of up to about 10 N, though the upper limit thereof is not particularly restricted.

The treatment temperature and time are widely variable depending on the kind of alkali to be used and the alkali concentration of the solution. As the alkali concentration is lowered, the treatment must be effected at a higher temperature for a longer period of time. The treatment temperature and time are usually chosen arbitrarily from within the range of ice-cooled bath temperature to 100° C. and from within the range of 10 minutes to 200 hours, respectively.

The uranium adsorbent of the present invention can be used to trap and recover uranium from all kinds of solutions containing uranium, particularly low-concentration aqueous solutions of uranium such as seawater. When the uranium adsorbent of the present invention is brought into contact with an aqueous solution of uranium, imidedioxime groups form a stable chelate with uranium. The chelate formation constant is so high that uranium can be highly efficiently adsorbed on the uranium adsorbent of the present invention at a high speed of adsorption.

The adsorbent of the present invention can be used in various manners according to the form thereof. For example, the adsorbent of the present invention may be packed into a column or tower, through which a solution containing uranium is then passed. Alternatively, the adsorbent of the present invention may be immersed into a solution containing uranium.

The adsorbent of the present invention on which uranium is adsorbed is subsequently brought into contact with an eluant to elute and recover uranium therefrom. Examples of the eluant that can be used include inorganic acids such as nitric acid, sulfuric acid, hydrochloric acid, and phosphoric acid; carbonates such as sodium carbonate, sodium hydrogencarbonate, and ammonium carbonate; various organic acids; and various amino acids.

The present invention will now be specifically illustrated by the following Examples, which, however, should not be construed as limiting the scope of the present invention.

EXAMPLE 1 AND COMPARATIVE EXAMPLE 1

Two kinds of 3 w/v % (weight/volume %) solutions of hydroxylamine were prepared by dissolving hydroxylamine respectively in two kinds of solvents, methanol alone (Comparative Example 1) and ethanol containing 50 vol. % of water (Example 1). 21 ml of each solution was added to 1 g of hollow polyacrylonitrile fibers, which were then heat-treated in the solution for 24 hours. A small amount of each of the two kinds of thus treated fibers were dissolved in $d_6$-DMSO and examined by $^{13}$C-NMR spectroscopy to take an NMR spectrum chart thereof. The integral ratio (areal ratio) of a peak at $\delta=148$ ppm, assigned to imidedioxime groups, to a peak at $\delta=155$ ppm, assigned to amidoxime groups, was found from the spectrum chart. The results are shown in Table 1.

TABLE 1

| Solvent | Reaction Temperature | Integral Ratio (imidedioxime:amidoxime) |
| --- | --- | --- |
| methanol | 65° C. | 1:3 |
| ethanol/water (50%) | 85° C. | 3:2 |

FIG. 1 shows the NMR spectrum chart of the uranium adsorbent of Example 1.

EXAMPLE 2

1.07 g of hydroxylamine hydrochloride was dissolved in ethanol containing 50 vol. % of water. 0.788 g of potassium hydroxide was added to the resulting solution to neutralize part of the hydroxylamine hydrochloride to thereby prepare an acidic solution of hydroxylamine, to which 1.49 g of polyacrylonitrile fibers (copolymer of 80 mol % acrylonitrile with 10 mol % methyl acrylate) were then added and heat-treated at 85° C. for 24 hours. A small amount of the thus treated fibers were examined by CPMAS (cross polarization magic angle spin) 13C-NMR spectroscopy to take an NMR spectrum chart thereof. The integral ratio (areal ratio) of a peak at $\delta=150$ ppm, assigned to imidedioxime groups, to a peak at $\delta=158$ ppm, assigned to amidoxime groups, was found from the spectrum chart. The result is shown in Table 2.

TABLE 2

| Solvent | Reaction Temperature | Integral Ratio (imidedioxime:amidoxime) |
|---|---|---|
| ethanol/water (50%) | 85° C. | 9:1 |

Figure 2:
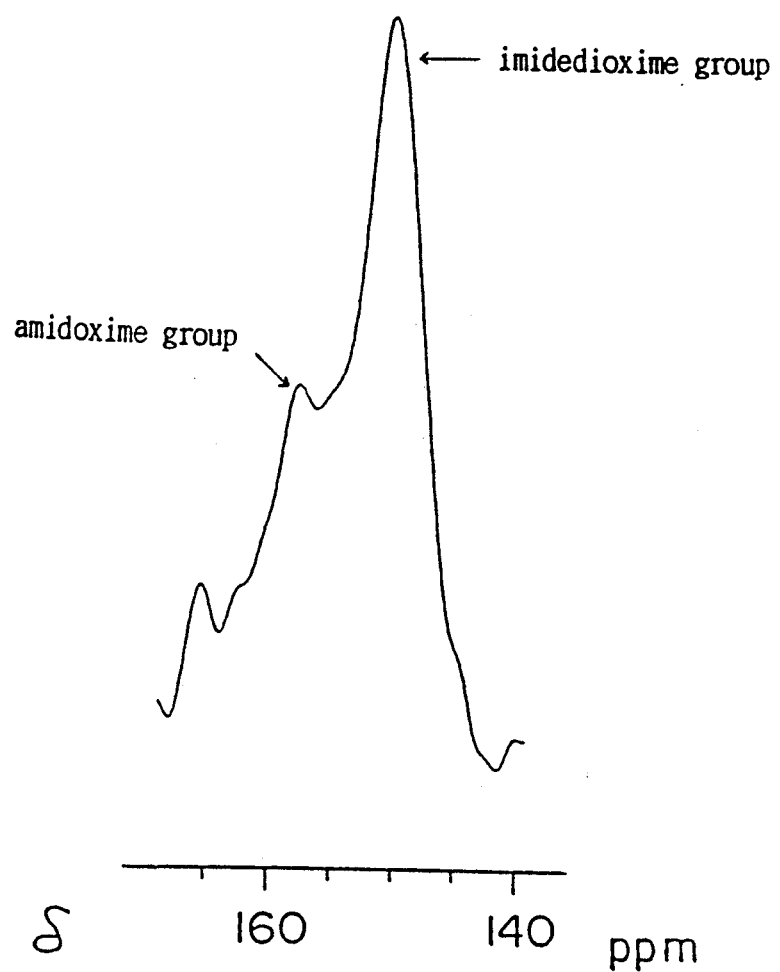
FIG. 2 is a diagram showing the $^{13}$C-NMR spectrum of another example of theuranium adsorbent according to the present invention.

FIG. 2 shows the NMR spectrum chart of the uranium adsorbent of Example 2.

EXAMPLE 3

The uranium adsorbent of Example 2 according to the present invention, wherein the amount of imidedioxime groups formed was relatively larger than that of amidoxime groups formed, was immersed in a 1 N solution of sodium hydroxide at room temperature. The uranium adsorbent thus immersed was taken out in a small amount each time at given intervals to take NMR spectrum charts thereof by CPMAS $^{13}$C-NMR spectroscopy. It was discovered from these spectrum charts that the peak assigned to amidoxime groups gradually dwindled as the immersion time was prolonged. In the CPMAS $^{13}$C-NMR spectrum chart of the uranium adsorbent, after 24 hours of the immersion, the peak assigned to imidedioxime groups remained, while no substantial peak assigned to amidoxime groups was recognizable and a peak at $\delta=184$ ppm, assigned to carbonyl groups which newly emerged, suggesting that the residual nitrile groups had been hydrolyzed.

EXAMPLE 4 AND COMPARATIVE EXAMPLE 2

100 ml of a 3 w/v % solution of hydroxylamine in a mixed solvent composed of ethanol and 50 vol. % water was added to 1 g of acrylonitrile fibers ($\phi=12$ μm), which were then heat-treated in the solution at 85° C. for hours. The thus treated fibers were separated from the solution by filtration, sufficiently washed with warm water, and sufficiently dried in a vacuum to obtain a uranium adsorbent according to the present invention (sample A).

50 mg of the thus obtained uranium adsorbent (sample A) according to the present invention was added to 5 liters of natural seawater, followed by stirring at 25° C. for 24 hours. The fibers of the adsorbent were separated from the seawater by filtration, and washed with distilled water. Thereafter, an elution operation with 10 ml of 1 N hydrochloric acid was repeated three times. The amount of uranium in the whole collected eluate was determined by the Arsenazo III method to find the uranium adsorption (i.e., the amount, per day and per unit weight of adsorbent, of uranium which had been adsorbed on the uranium adsorbent) (Test No. 1).

20 mg of the above-mentioned fibers of the adsorbent (sample A) was immersed in 10 ml of a 1 N solution of sodium hydroxide at room temperature for 24 hours. Separately, the same immersion was continued for 72 hours. The two kinds of fibers after the immersion were each neutralized and sufficiently washed with water to prepare two kinds of uranium adsorbents according to the present invention which had the residual nitrile groups hydrolyzed under alkaline conditions. Each of the thus obtained uranium adsorbents was added to 5 liters of natural seawater. The uranium adsorption by each of these uranium adsorbents was determined in the same manner as described above (Tests Nos. 2 and 3).

Part of the conventional uranium adsorbent of Comparative Example 1 was immersed in an alkali solution in the same manner as described hereinbefore for 24 hours. 50 mg of each of the uranium adsorbent of Comparative Example 1 and the conventional alkali-treated uranium adsorbent thus prepared was added to 5 liters of natural seawater. The uranium adsorption by each of these uranium adsorbents was determined in the same manner as described hereinbefore (Test Nos. 4 and 5).

The results are shown in Table 3.

TABLE 3

| Test No. | Alkali Immersion Time (hours) | Integral Ratio (imidedioxime/amidoxime) | Uranium Adsorption (μgU/g · Ad · day) |
|---|---|---|---|
| 1 | 0 | 3/2 | 100 |
| 2 | 24 | — | 550 |
| 3 | 72 | — | 850 |
| 4 | 0 | ½ | 50 |
| 5 | 24 | — | 150 |

As can be seen in Tables 1 and 2, the uranium adsorbents according to the present invention, not subjected to the alkali immersion treatment, had a relatively larger amount of imidedioxime groups formed than that of amidoxime groups formed. As can be seen in Table 3, the uranium adsorbent according to the present invention, not subjected to the alkali immersion treatment (Test No. 1), exhibited twice as much uranium adsorption as the conventional uranium adsorbent (Test No. 4) having a relatively larger amount of amidoxime formed than that of imidedioxime groups formed.

As can be seen in Table 3, the conventional adsorbent, when subjected to the alkali treatment (Test No. 5), exhibited merely about three times as much uranium adsorption as when not subjected to the alkali treatment (Test No. 4), whereas the above-mentioned uranium adsorbent according to the present invention, when subjected to the alkali immersion treatment, exhibited 5.5 times (Test No. 2) to 8.5 times (Test No. 3) as much uranium adsorption as when not subjected to the alkali immersion treatment (Test No. 1), thus proving a remarkably increased effect of hydrolysis of the residual nitrile groups under alkaline conditions.

As will be understandable from the foregoing description, the uranium adsorbent of the present invention has various advantages, including a far larger uranium adsorption than conventional uranium adsorbents such that the amount of uranium adsorbed thereon per unit amount of the adsorbent can be greatly increased to provide an eluate having a higher uranium concentration than those obtained in the case of the conventional uranium adsorbents, particularly when the adsorbent is used to adsorb and separate uranium from seawater.

We claim:

1. A uranium adsorbent formed by reacting a polymer containing nitrile groups with hydroxylamine, wherein the amount of imidedioxime groups formed is relatively larger than that of amidoxime groups formed with respect to the integral values of areas of peaks respectively assigned to said imidedioxime groups and said amidoxime groups in the $^{13}$C-NMR spectrum of said uranium adsorbent.

2. The uranium adsorbent of claim 1, which is formed by reacting said polymer with said hydroxylamine in an organic solvent containing water under substantially neutral or weakly alkaline conditions.

3. The uranium adsorbent of claim 1, which is formed by reacting said polymer with said hydroxylamine under acidic conditions.

4. The uranium adsorbent of any one of claims 1 to 3, wherein said uranium adsorbent contains residual nitrile groups, and said residual nitrile groups are hydrolyzed under alkaline conditions.

* * * * *